United States Patent
Nataraja et al.

(10) Patent No.: US 10,469,629 B2
(45) Date of Patent: Nov. 5, 2019

(54) CONTAINER NETWORKING FOR CONNECTING NETWORK CONTROLLER APPLICATIONS TO A SWITCH FABRIC

(71) Applicant: Cisco Technology, Inc., San Jose, CA (US)

(72) Inventors: Rajesh B. Nataraja, Sunnyvale, CA (US); Viral Barot, San Jose, CA (US); Chirag Tayal, Fremont, CA (US); Esha Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 15/692,398

(22) Filed: Aug. 31, 2017

(65) Prior Publication Data
US 2018/0375825 A1 Dec. 27, 2018

Related U.S. Application Data

(60) Provisional application No. 62/524,107, filed on Jun. 23, 2017.

(51) Int. Cl.
*H04L 29/06* (2006.01)
*H04L 29/12* (2006.01)
(Continued)

(52) U.S. Cl.
CPC .......... *H04L 69/16* (2013.01); *G06F 9/45558* (2013.01); *G06F 9/5077* (2013.01);
(Continued)

(58) Field of Classification Search
CPC ... G06F 9/45558; G06F 9/5077; H04L 69/16; H04L 67/1034; H04L 45/74; H04L 61/1511
See application file for complete search history.

(56) References Cited

U.S. PATENT DOCUMENTS

| 2009/0157882 A1* | 6/2009 | Kashyap | H04L 69/16 |
| | | | 709/227 |
| 2016/0205106 A1* | 7/2016 | Yacoub | H04L 61/1511 |
| | | | 726/28 |

(Continued)

OTHER PUBLICATIONS

Diego Asturias, "Container Technology: Opportunity and Challenge for Network Engineers", Dec. 31, 2016, 5 pages.
Mark Church, "Docker Reference Architecture: Designing Scalable, Portable Docker Container Networks", May 12, 2017, https://success.docker.com/Architecture/Docker_Reference_Architecture%3A_Development_Pipeline_Best_Practices_Using_Docker_ . . . , 20 pages.

(Continued)

*Primary Examiner* — Kyung H Shin
(74) *Attorney, Agent, or Firm* — Edell, Shapiro & Finnan, LLC (57) ABSTRACT

A network controller deploys network management applications to containers hosted on compute nodes. For each container on each compute node, the controller determines the network connectivity required by the application; assigns to the container one or more Internet Protocol (IP) addresses that satisfy the network connectivity, and provides the one or more IP addresses to the container; upon detecting the container is lost, blocks the one or more IP addresses so that the they cannot be re-assigned to any other container; and upon detecting that the application has been re-deployed to a new container on a new compute node, unblock the blocked one or more IP addresses, and assign and send the one or more IP addresses to the new container to enable the new container to establish the network connectivity required by the application without network address translation.

20 Claims, 10 Drawing Sheets

(51) Int. Cl.

| | |
|---|---|
| *G06F 9/50* | (2006.01) |
| *G06F 9/455* | (2018.01) |
| *H04L 29/08* | (2006.01) |
| *H04L 12/741* | (2013.01) |
| *H04L 12/26* | (2006.01) |
| *H04L 12/713* | (2013.01) |
| *H04L 12/24* | (2006.01) |

(52) U.S. Cl.
CPC .......... *H04L 43/0811* (2013.01); *H04L 43/10* (2013.01); *H04L 45/74* (2013.01); *H04L 61/1511* (2013.01); *H04L 61/2007* (2013.01); *H04L 61/256* (2013.01); *H04L 67/1034* (2013.01); *H04L 41/0816* (2013.01); *H04L 45/586* (2013.01); *H04L 61/2514* (2013.01)

(56) References Cited

U.S. PATENT DOCUMENTS

2016/0371127 A1\* 12/2016 Antony ................ G06F 9/5077
2017/0041222 A1    2/2017 Hooda et al.
2017/0180250 A1\* 6/2017 Shen ................... G06F 9/45558

OTHER PUBLICATIONS

Lars Kellogg-Stedman, "Four ways to connect a docker container to a local network", Aug. 11, 2014, Odd Bits, 5 pages.
Marco Bizzantino, "Overlay Network Multi Docker Host Networking", Kiratech, https://github.com/docker/docker/blob/master/experimental/vlan-networks..md, Jun. 2, 2017, 24 pages.

\* cited by examiner

CONTAINER NETWORKING FOR CONNECTING NETWORK CONTROLLER APPLICATIONS TO A SWITCH FABRIC

CROSS REFERENCE TO RELATED APPLICATION

This application claims priority to U.S. Provisional Application No. 62/524,107, filed 23 Jun. 2017, the entirety of which is incorporated herein by reference.

TECHNICAL FIELD

The present disclosure relates to a network management using containers.

BACKGROUND

A network management system employs many different network management applications to manage, monitor, and maintain a network. New applications and updates to the applications are frequently rolled-out, but extended deployment cycles, i.e., time-to-update, can frustrate customers and negatively impact revenue. The applications may be containerized, i.e., deployed in software containers (i.e., "containers") that run on compute nodes. Connections between the containers and the network being managed enable the applications running in the containers to communicate with and control the network. Managing the connections can be a challenge when initially deploying the containers to the compute nodes and migrating the containers across the compute nodes.

DESCRIPTION OF EXAMPLE EMBODIMENTS

Overview

In an embodiment, a method is performed by a controller of a network management system that is configured to manage a network. The network management system includes networked compute nodes, a first switch fabric and a second switch fabric to connect the compute nodes to a control plane and a management plane of the network, respectively, and network management applications that require network connectivity to the first switch fabric and the second switch fabric to communicate with the management plane and the control plane, respectively, in order to manage the network. The method includes deploying the applications to respective containers hosted on the compute nodes. The method also includes, for each container on each compute node: determining the network connectivity required by the application; assigning to the container one or more Internet Protocol (IP) addresses that satisfy the network connectivity, and providing the one or more IP addresses to the container; upon detecting the container is lost, blocking the one or more IP addresses so that the one or more IP addresses cannot be re-assigned to any other container; and upon detecting that the application has been re-deployed to a new container on a new compute node, unblocking the blocked one or more IP addresses, and assigning and sending the one or more IP addresses to the new container to enable the new container to establish the network connectivity required by the application without network address translation.

In another embodiment, a data center network manager (DCNM) distributes DCNM applications for managing a switch fabric into DCNM containers that are networked across a swarm of compute nodes that host the containers. The DCNM containers communicate with a management plane and a control plane of the switch fabric through an out-of-band (OOB) fabric and an in-band (IB) fabric (i.e., fabric underlay) respectively. The DCNM uses a namespace modification mechanism when containers in the swarm come-up (i.e., are instantiated on a compute node). The DCNM discovers a namespace of each container and creates an interface e.g., a MAC-VLAN interface, that can directly connect the DCNM application in the container with a control plane of the switch fabric, i.e., to the fabric underlay, without involving network address translation (NAT). When containers move around, die, and restart, the DCNM ensures that all of the containers for a given DCNM application receive the same block of IP addresses inside the swarm.

Detailed Description

Figure 7:
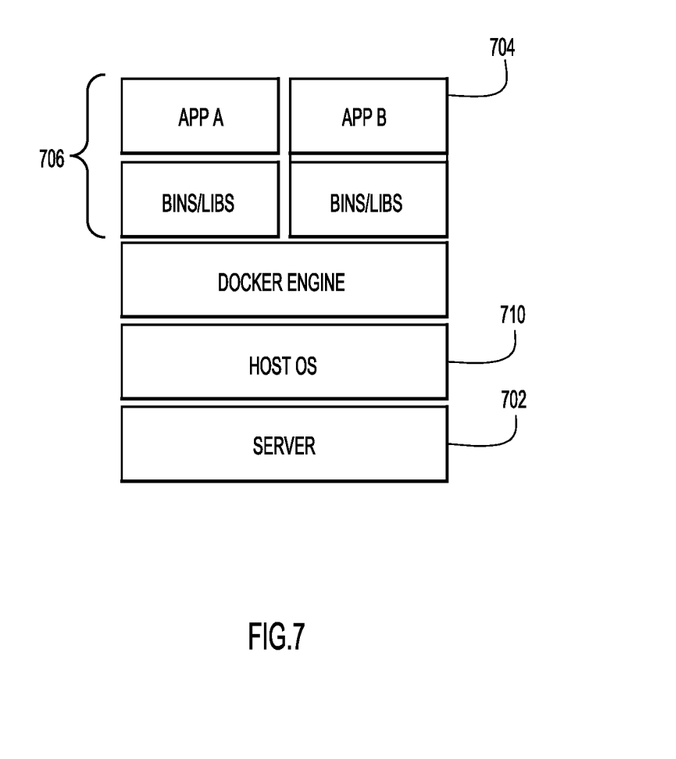
FIG. 7 is a block diagram of a server or compute node that hosts containers, according to an example embodiment.

A network controller may use software containers ("containers") to manage a network. Containers may be implemented using basic technology provided by "Docker." Docker is a software platform that allows building, testing, and deploying of software applications that execute in the containers. Containers may be deployed in a network of containers referred to as a "swarm." The swarm is a cluster of compute nodes, such as servers, that host containers deployed to the compute nodes. A container includes resources required for a software application (simply "application") to execute, including, but not limited to, libraries, monitoring tools, and a namespace to provide the container with an identity and connectivity to an environment of the container. The container namespace includes components such as processor identifier (PID), Net (Network), User, and inter-process communication (IPC), for example. The Net component defines various network interface devices, IP addresses, routing rules, Netfilter rules, and so on. With reference to FIG. 7, there is a block diagram of an example server or compute node 702 that hosts containers 704 and 706. Server 702 hosts an operating system (OS) 710, Docker engine software to manage containers 704 and 706. Containers 704 and 706 execute respective applications App A and App B, which use respective binary files and libraries labeled "Bins/Libs."

In conventional implementations, Docker works by creating a routing mesh and provides a mechanism to load balance an application across multiple containers inside the swarm. When the containers talk outside the swarm, Docker defaults to network address translating the container via an interface of the compute node on which the container is hosted. Each time the container moves across compute nodes, the NAT changes. When the container is used to manage a network, the NAT change requires a corresponding change to the network managed. Reconfiguring the network every time a container moves is inefficient.

According to embodiments presented herein, a data center network manager (DCNM) employs containers networked across a swarm of compute nodes to manage a network, but avoids the above-mentioned NAT changes and other disadvantages of conventional implementations. For example, embodiments presented herein use a namespace modification mechanism when containers in the swarm come-up (i.e., are instantiated on a compute node). The embodiments discover a namespace of the container and create an interface e.g., a MAC-VLAN interface, that can directly connect the DCNM application in the container with a control plane, e.g., to an underlay, or a management plane of the network, without involving NAT. The container is still connected with other containers performing network management through a swarm overlay network (as described below), for example. Additionally, the DCNM assigns a single layer 2 (L2) network that can be used to manage the IP address of each container. When containers move around, die, and restart, the embodiments ensure that all of the containers of a DCNM application receive the same block of IP addresses inside the swarm. These IP addresses can be assigned directly for use in the network being managed by the DCNM, as the IP addresses do not go through NAT and do not change when moving across a swarm. These and other features are described more fully below in connection with the figures.

Figure 1:
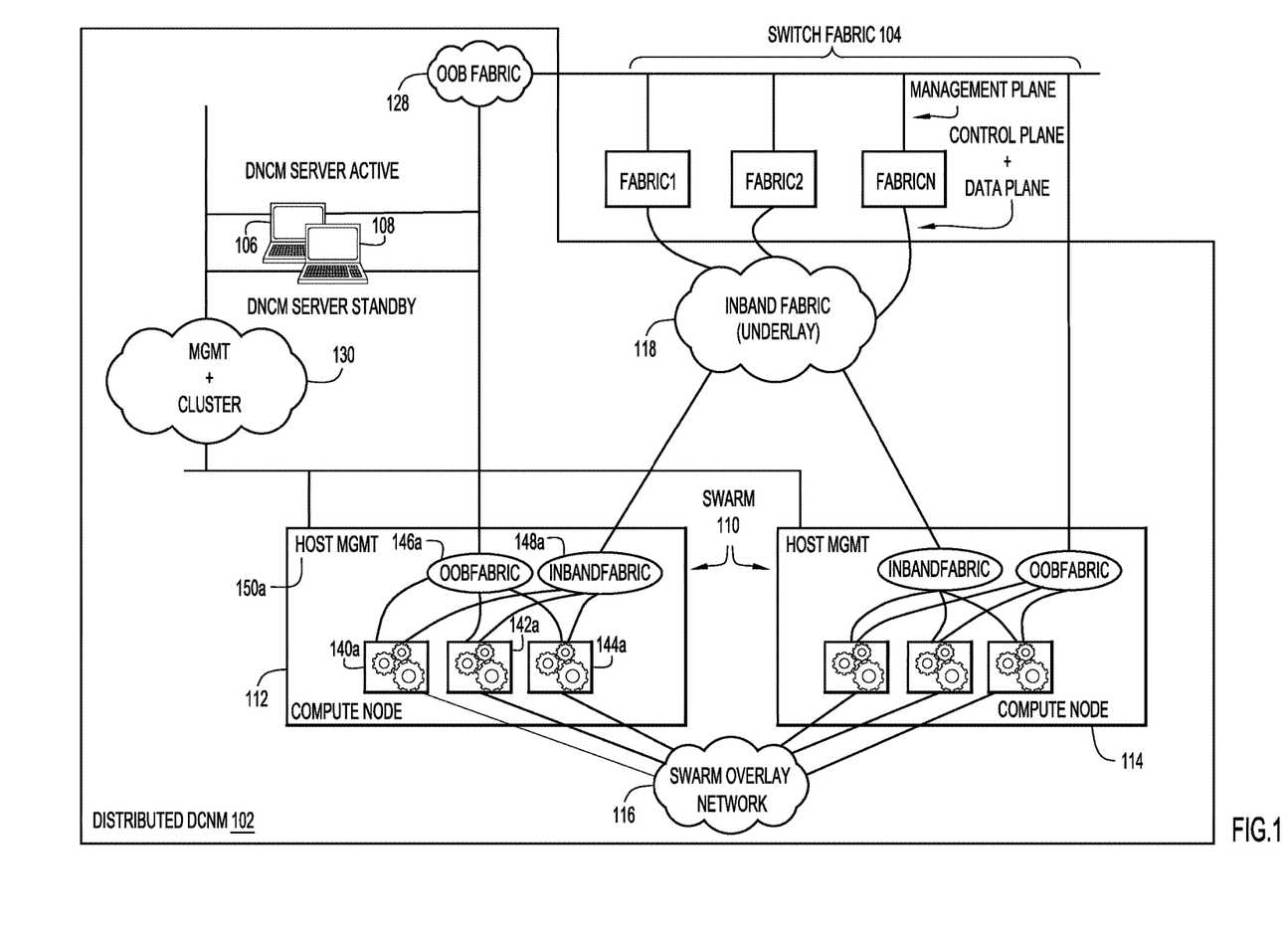
FIG. 1 is a block diagram of a system in which a distributed data center network manager (DCNM) manages, monitors, and controls a network (e.g., a switch fabric) using DCNM containers running on networked DCNM compute nodes, according to an example embodiment.

With reference to FIG. 1, there is a block diagram of a DCNM 102 (also referred to as a "distributed network management system") that employs DCNM containers networked across a swarm of compute nodes to manage a network in the form of a switch fabric 104. Switch fabric 104 includes sub-fabrics Fabric1-FabricN, each including a fabric of configurable, inter-connectable, switches and/or routers. A representative network device is described below in connection with FIG. 6. Generally, each switch/router (referred to as a "network device") includes network/data ports for sending and receiving data packets, and a management port/interface through which an external actor in DCNM 102 controls/manages the network device. More specifically, the network/data ports support communications in both a data plane and a control plane (i.e., control/data plane) that is used by an external actor (e.g., a DCNM application running in a DCNM container) to provision/configure components of the network device, while the management port/interface supports communications in a management plane used by an external actor (e.g., a DCMN application running in a DCNM container and implementing a network administrator role) to manage the network device. Examples of (DCNM) control plane applications include Border Gateway Protocol (BGP). A container running such control plane applications communicates with switch fabric 104 via the control plane. Examples of (DCNM) management plane applications include a syslog server application that connects to the network device via the management port and collects the event logs. A container running such management plane applications communicates with switch fabric 104 via the management plane.

Figure 2:
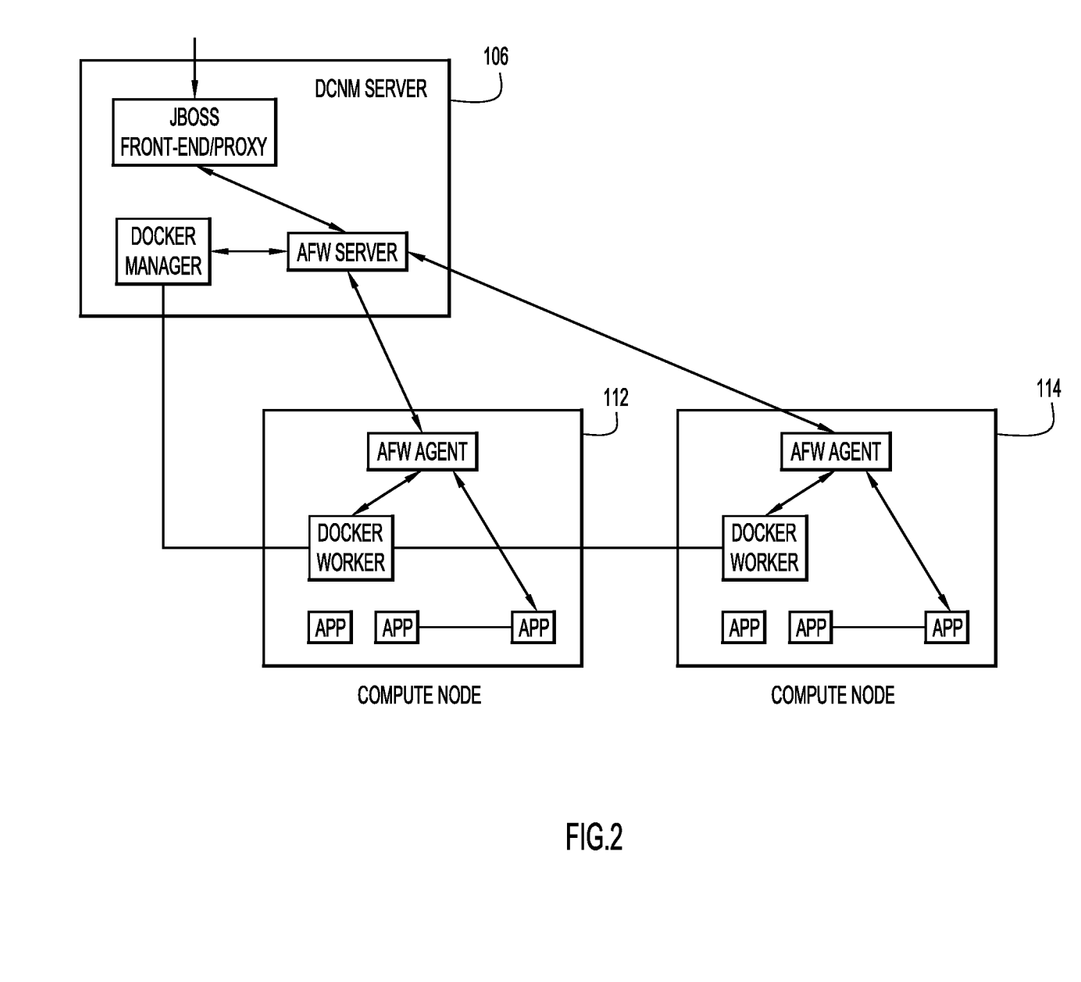
FIG. 2 is an illustration of a software architecture used in the distributed DCNM, according to an example embodiment.

DCNM 102 includes an active DCNM server 106, a backup DCNM server 108 (where the servers 106 and 108 are also each referred to as a "network controller"), a swarm 110 of DCNM compute nodes 112 and 114 that host DCNM containers managed by the active server, a swarm overlay network 116 to connect the compute nodes and their hosted containers to each other, an in-band (IB) fabric 118 (also referred to as underlay 118) to connect the compute nodes and their hosted containers to a first side of switch fabric 104 (i.e., the network/data ports of the network devices in switch fabric 104), an out-of-band (OOB) fabric 128 to connect the compute nodes and their hosted containers to a second side of switch fabric 104 (i.e., the management ports of the network devices in switch fabric 104), and a management and cluster fabric 130 to connect the servers to the compute nodes and their hosted containers. Two compute nodes are shown in FIG. 2 by way of example, only. It is understood that DCNM 102 may include any number of compute nodes and that each compute node may host any number of DCNM containers. IB fabric 118 and OOB fabric 128 may each include multiple network devices that are connected to each other to form the corresponding fabric. Connections between computed nodes 112 and 114 and each of IB fabric 118 and OOB fabric 128 may include L2 connections, such as Ethernet connections, for example, that support higher-level (e.g., L3 and higher) communication protocols.

DCNM 102 hosts many DCNM applications that perform specialized network management functions that interact/communicate with switch fabric 104 over OOB fabric 128 and IB fabric 118. DCNM server 106 hosts some of the DCNM applications, while DCNM 102 distributes others of the DCNM applications across DCNM compute nodes 112 and 114 as DCNM containers. DCNM server 106 controls distribution of DCNM applications in DCNM containers to compute nodes 112 and 114 over management and cluster fabric 130. The DCNM containers may operate generally in accordance with Docker, but embodiments presented herein extend and/or change the functionality of Docker, or add features, that avoid the limitations of Docker described above and provide additional functionality not provided by Docker. For convenience, the qualifier "DCNM" may be dropped when referring to the DCNM servers, DCNM compute nodes, DCNM containers, and DCNM applications.

Compute node 112 hosts containers (i.e., containerized applications) 140a, 142a, 144a configured on the compute node under control of server 106. Compute node 112 includes an OOB fabric interface 146a through which the containers hosted on the compute node communicate with OOB fabric 128, an IB fabric interface 148a through which the containers communicate with IB fabric 118, and a host management interface 150a through which the containers communicate with management and cluster fabric 130. As will be described below in connection with FIGS. 3 and 4, OOB fabric interface 146a and IB fabric interface 148a may each be container MAC-VLAN interfaces configured with IP addresses provided by server 106. Compute node 114 is configured to host containers and includes interfaces similar to compute node 112. The containers hosted by compute node 112 and the containers hosted by compute node 114 communicate with each other over swarm overlay network 116.

DCNM 102 may start a DCNM application (also referred to in ensuing description simply as an "application") on any of compute nodes 112 and 114 in swarm 110, with replicas of the application spread throughout the swarm. DCNM 102 assigns to each application a set of IP address for each of the networks to which the application needs access (e.g., IB fabric 118 and/or OOB fabric 128) based on the number of container replicas that exist for the application. When a container is running, DCNM 102 creates an interface for the container which attaches to the network(s) (IB fabric 118 and/or OOB fabric 128) to which the container needs access. The interface is moved to the namespace of the container and DCNM 102 assigns an IP address from a reserved set of IP addresses to the container interface. The assigned IP address identifies the container and is used by the container for communicating with other networks in DCNM 102. This framework ensures that even when the container dies and starts anywhere else in swarm 110 (i.e., when an application deployed to a first container migrates to a second container), DCNM 102 can ensure that the container regains its connectivity with an IP address from the reserved block and avoid the need for network address translation. Another advantage is the ability to connect IB fabric 118 with the East-West network of the Docker swarm.

With reference to FIG. 2, there is an illustration of an example software architecture used in distributed DCNM 102. Server 106 hosts a front-end proxy, a Docker manager to provide basic container management functions, Application FrameWork (AFW) server logic to implement specific processes for managing the configuring/networking of containers, and also of blocking, unblocking, and assigning of IP Addresses for each of the containers, as presented herein. Compute nodes 112 and 114 each include AFW agent logic that interacts with the AFW server in server 106 to implement the specific process presented herein, multiple (DCNM) applications "App" each running in its own container, and Docker worker logic to manage the local containers. The above-described Docker management logic enables compute nodes 112 and 114 to monitor container events indicative of the status of containers hosted on the compute nodes, such as whether any given container has just started or "come-up," is operational, has died (i.e., stopped running), needs further configuring, and so on, and to report those events to server 106. Similarly, the above-described Docker management logic enables server 106 to monitor the container events reported by compute nodes 112 and 114 to learn the status of the containers. Container events may include periodic "heart beat" events indicating container operation, and the absence of which over a predetermined period of time may indicate that a container has died, or from the perspective of server 106, that the compute node that hosts the container has lost connectivity with server 106 or has otherwise failed.

Figure 3:
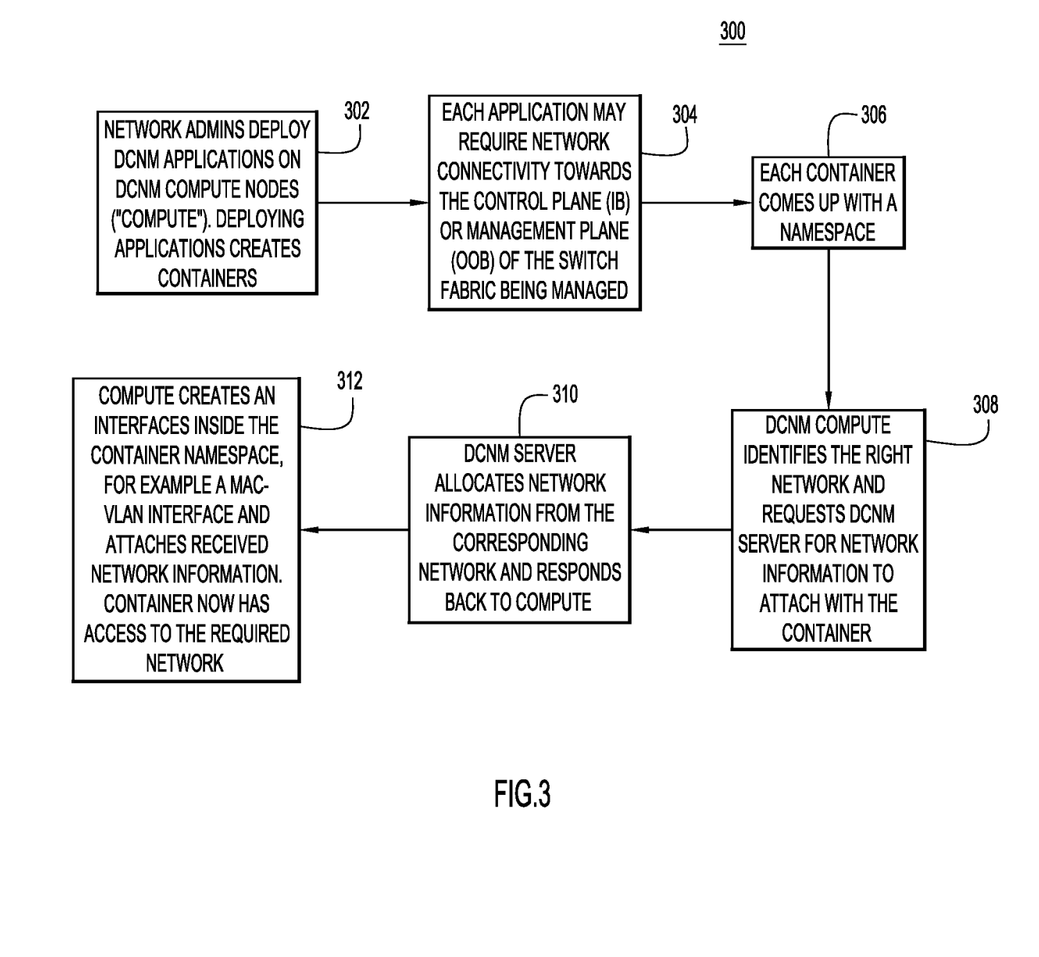
FIG. 3 is a flowchart of a method of attaching a DCNM container (i.e., a container that is to run a DCNM application) to a DCNM compute node, according to an example embodiment.

With reference to FIG. 3, there is a flowchart of an example method 300 of attaching a new container (i.e., a container that is to run an application) to the network of containers. Method 300 deploys an application to a new container hosted on one of compute nodes 112 or 114, and helps configure the new container. It is assumed that server 106 reserves a distinct set of one or more IP addresses (e.g., a distinct block of IP addresses) for each application, which are to be assigned to the container(s) to which the application is(are) deployed in method 300 and in method 400 (described later). Server 106 creates and maintains a database that maps each application to the distinct set of IP addresses reserved to that application. An example of such a database is described below in connection with FIG. 8. If an application requires network connectivity only to IB fabric 118 or OOB 128, then the block of IP addresses for the application will be reserved only for use with the IB fabric or the OOB fabric. If the application requires network connectivity to both, then the block of IP addresses of the application will be reserved for use with the IB fabric and the OOB fabric. Server 106 may reserve the distinct sets of IP addresses, one set per application, either as an a priori operation before method 300 is performed, or while method 300 is performed.

At 302, a DCNM network administrator (person or function) deploys an application to one of compute nodes 112 and 114. This may be done through server 106 or another interface to the compute node. This causes the compute node to create/instantiate on the compute node a container for the application. In an example, the application may include a "specification file" or "spec file" that identifies the application (e.g., by an application identifier) and specifies/indicates what network connectivity the application needs to perform its network management function(s). For example, the spec file may indicate that the application requires connectivity to the control plane (i.e., IB fabric 118), the management plane (i.e., OOB fabric 128), or both.

At 304, the compute node examines the spec file of the application to determine what network connectivity to switch fabric 104 the application requires to control the switch fabric in accordance with the functionality implemented by the application. Specifically, the compute node determines whether the application requires network connectivity to (i) the control plane of switch fabric 104 through IB fabric 118, and/or (ii) the management plane of switch fabric 104 through OOB fabric 128.

At 306, the instantiated container creates its own container namespace.

At 308, once the compute node determines the network connectivity (e.g., IB fabric 118 or OOB fabric 128) to switch fabric 104 that is required by the application based on operation 304, the compute node sends to server 106 a message/request that identifies the application and indicates the network connectivity required by the application (i.e., whether the application requires network connectivity to the IB fabric 118 and/or OOB fabric 128). Server 106 receives the request sent by the compute node.

At 310, responsive to the request received from the compute node, server 106 allocates/assigns to the container for the identified application the network information required by the application, and sends the network information to the (requesting) compute node. Assuming server 106 has already reserved a distinct set/block of IP addresses for the application, in operation 310, server allocates/assigns one or more of the IP addresses from the distinct set/block of IP addresses, and records in the database (that maps the sets of IP addresses to the applications) an indication of which of the one or more IP addresses are allocated/assigned to which container in operation 310. In an example, server 106 assigns one IP address per network connectivity required, e.g., a first IP address for network connectivity to IB fabric 118 and a second IP address to OOB fabric 128, if needed. The network information sent by server 106 may also include IP addresses and MAC addresses used by the required network, e.g., IP and MAC addresses for IB fabric 118 and for OOB fabric 128. The compute node receives the network information sent by server 106.

At 312, responsive to the network information (i.e., upon receipt of the network information from server 106), the compute node creates an interface inside the container namespace, e.g., the compute node creates a MAC-VLAN interface, and attaches the received network information to the container namespace in association with the created interface. For example, the compute node attaches the one or more IP addresses to the MAC-VLAN interface. The MAC-VLAN interface allows a physical interface to have multiple MAC addresses and multiple IP addresses. The container (and application deployed thereto) now has access to the required network(s) (e.g., IB fabric 118 and/or OOB fabric 128) via the created interface.

Figure 4:
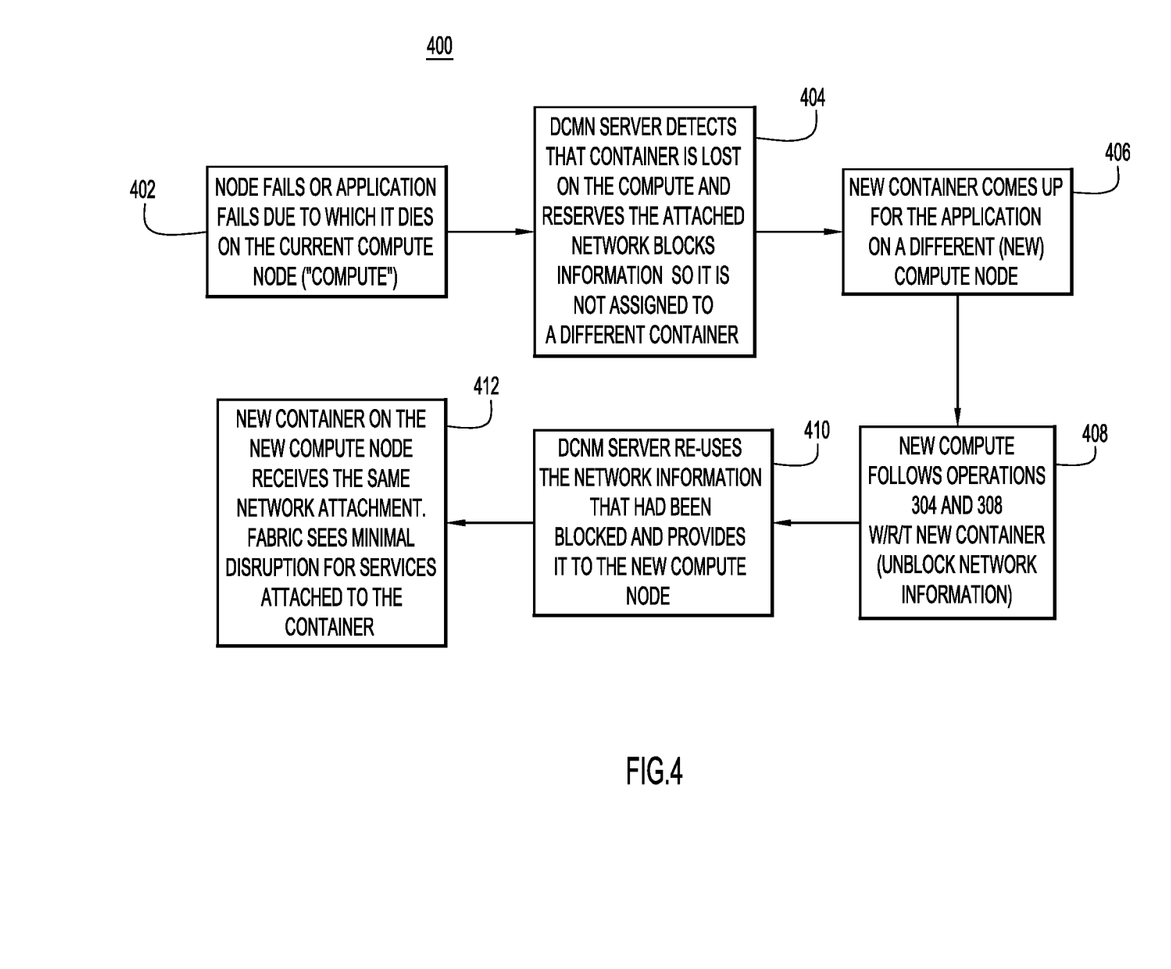
FIG. 4 is a flowchart of a method of migrating an application from a container to a new container, and reattaching the new container to a network of containers across compute nodes, according to an example embodiment.

With reference to FIG. 4, there is a flowchart of an example method 400 of migrating an application from one container to another container, and attaching the container to a network. Because both containers will execute the same application, method 400 may also be referred to as migrating the container connected to a network and reattaching the container to the same network. It is assumed that server 106 monitors the status the compute nodes, e.g., compute nodes 112 and 114, and the containers hosted on the compute nodes and to which applications have been deployed using method 300. For example, server 106 may monitor container events reported by compute nodes 112 and 114 and other indicators of the operational status or health of the compute nodes themselves, such as network connectivity status and health reports collected from the compute nodes over management and cluster network 130.

At 402, a container hosted on a compute node, and to which an application was previously deployed in method 300, is lost. The loss may arise because the container has died (i.e., stopped executing), or because the compute node either failed or lost connectivity with server 106, IB fabric 118, and/or OOB fabric 128.

At 404, server 106 monitors the status of the compute nodes and the containers hosted on the compute nodes as mentioned above, and detects the loss of the container (i.e., that the container is lost) on the compute node. Upon detecting the loss, server 106 blocks the network information, e.g., the one or more IP addresses, that was previously allocated/assigned to the container in method 300 so that the network information cannot be assigned to any other container that to which a different application is or will be deployed. For example, server 106 sets a block flag for each of the one or more IP addresses in the database.

At 406, also upon detecting that the container is lost, server 106 may re-deploy the application that was previously deployed to the container that is lost to a new container on a new compute node that is different from the original compute node. This action instantiates the new container in association with the application on the new compute node, which effectively represents a migration of the application to the new container on the new compute node. In an example, server 106 may only re-deploy the application to the new container when the lost container does not restart on the compute node within a predetermined time period after the server detected it as being lost, i.e., the server waits the pre-determined time period (in hopes of the restart) before the server re-deploys the application. The new container creates its own namespace, as described in operation 306.

At 408, assuming migration of the application to the new container on the new compute node, server 106 unblocks the one or more IP addresses so that they can be assigned to the new container. For example, server 106 resets/clears the block flag for each of the one or more IP addresses. Also at 408, server 106 and the new compute node repeat operations 304 and 308 with respect to the new container on the new compute node. Thus, the new compute node determines the network connectivity required by the application deployed to the new container (which is the same network connectivity that was required prior to migration), and sends a request to server 106 that identifies the application and indicates the required network connectivity. Server 106 receives the request sent by the new compute node.

At 410, in response to the request sent by the new compute node, server 106 re-allocate/re-assign the one or more IP addresses to the new container, and sends the one or more IP addresses to the new container to enable the new container to establish the network connectivity required by the application deployed to the new container, as described above in connection with method 300. The new compute node receives the one or more IP addresses sent by server 106. Operation 410 is similar to operation 310, except that in operation 410, server 106 reuses the IP addresses that had been blocked.

Operations 406-410 may be summarized as detecting that the application has been re-deployed to a new container on a new compute node (either under the direct action of server 106 or otherwise, e.g., via compute node-to-compute node communications over swarm overlay network 116, without any intervention from the server), unblocking the blocked one or more IP addresses, and assigning and sending the one or more IP addresses to the new container to enable the new container to establish the network connectivity required by the application without network address translation.

At 412, responsive to the network information (i.e., upon receipt of the network information received from server 106), the new compute node creates an interface inside the container namespace of the new container, e.g., the new compute node creates a MAC-VLAN interface, and attaches the received network information to the container namespace in association with the created interface. For example, the new compute node attaches the one or more IP addresses to the MAC-VLAN interface. The new container (and application deployed thereto) now has access to the same required network(s) as before (prior to migration) (e.g., IB fabric 118 and/or OOB fabric 128) via the created interface.

Figure 5:
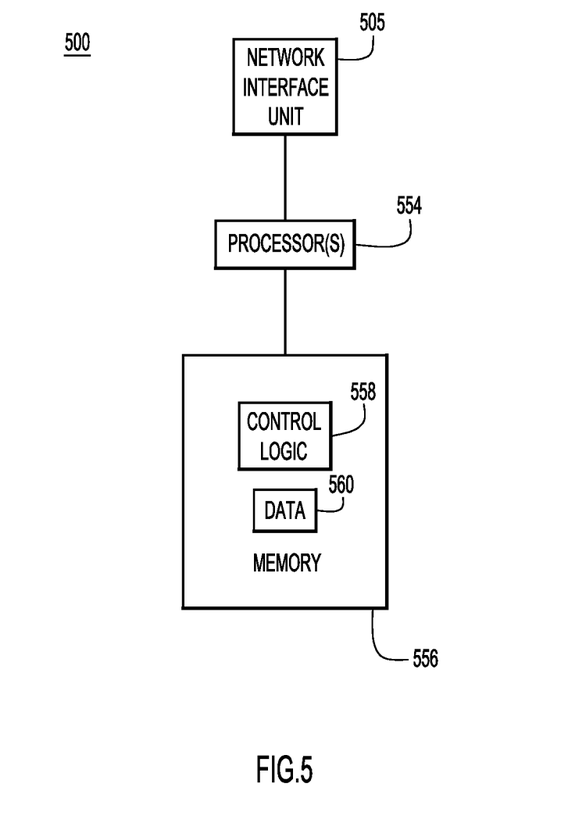
FIG. 5 is a block diagram of a computer device for a DCMN server and a DCNM compute node, according to an example embodiment.

With reference to FIG. 5, there is a block diagram of an example computer device 500, such as a server device representative of a server or a compute node. Computer device 500 includes network interface unit 505 to communicate with a wired and/or wireless communication network. Computer device 500 also includes a processor 554 (or multiple processors, which may be implemented as software or hardware processors), and memory 556. Network interface unit 505 may include an Ethernet card with a port (or multiple such devices) to communicate over wired Ethernet links and/or a wireless communication card with a wireless transceiver to communicate over wireless links.

Memory 556 stores instructions for implementing methods described herein. Memory 556 may include read only memory (ROM), random access memory (RAM), magnetic disk storage media devices, optical storage media devices, flash memory devices, electrical, optical, or other physical/tangible (non-transitory) memory storage devices. The processor 554 is, for example, a microprocessor or a microcontroller that executes instructions stored in memory. Thus, in general, the memory 556 may comprise one or more tangible computer readable storage media (e.g., a memory device)

encoded with software comprising computer executable instructions and when the software is executed (by the processor 554) it is operable to perform the operations described herein. For example, memory 556 stores control logic 558 to perform operations for server 106 and the compute nodes as described herein. The memory 556 may also store data 560 used and generated by logic 558.

Figure 6:
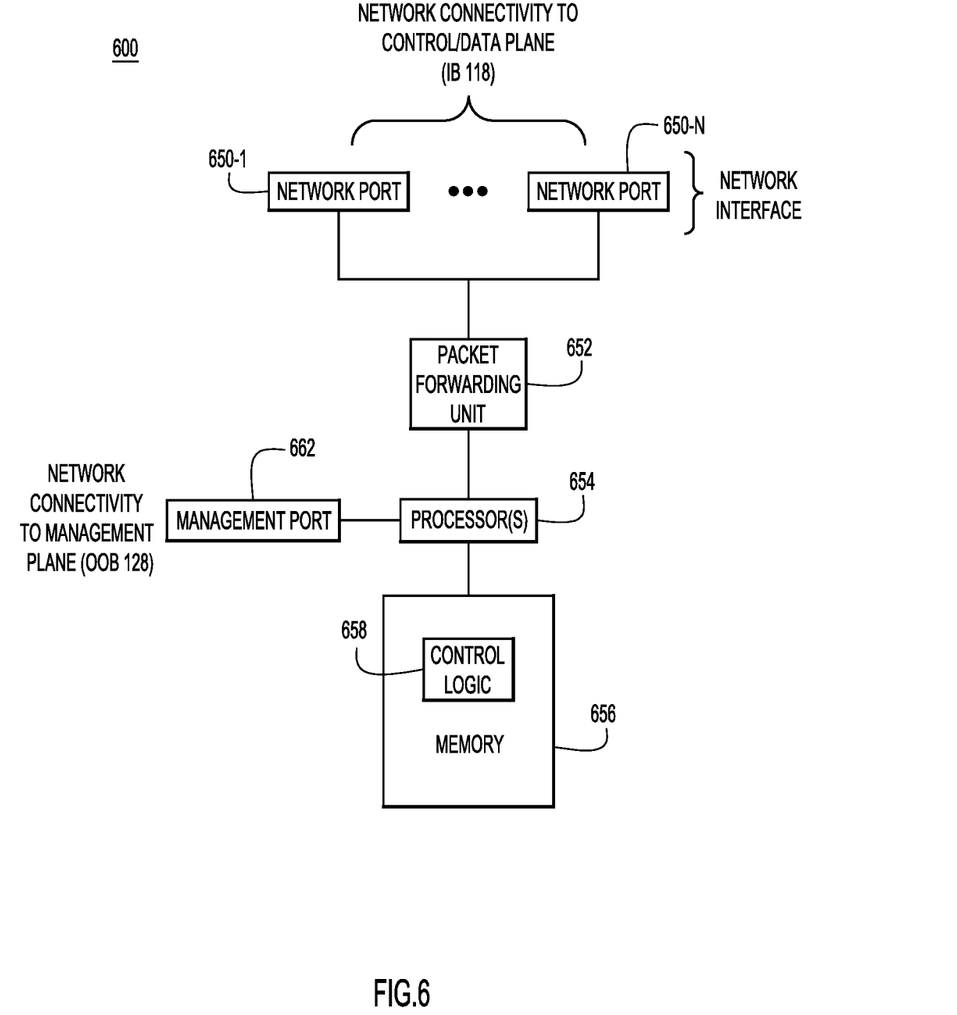
FIG. 6 is a block diagram of a network device in the switch fabric, according to an example embodiment.

With reference to FIG. 6, there is a block diagram of an example network device 600 in switch fabric 104. Network device 600 may represent a network router, a network switch, and the like. Network device may also represent network devices used in IB fabric 118 and OOB fabric 128. Device 600 may include a plurality of network ports 650-1 through 650-N, a packet forwarding unit or switch fabric 652 to perform routing/switching between the ports, a processor 654 (or multiple processors), and memory 656, and a management port 662. The memory 656 he processor 654 executes instructions stored in memory.

Figure 8:
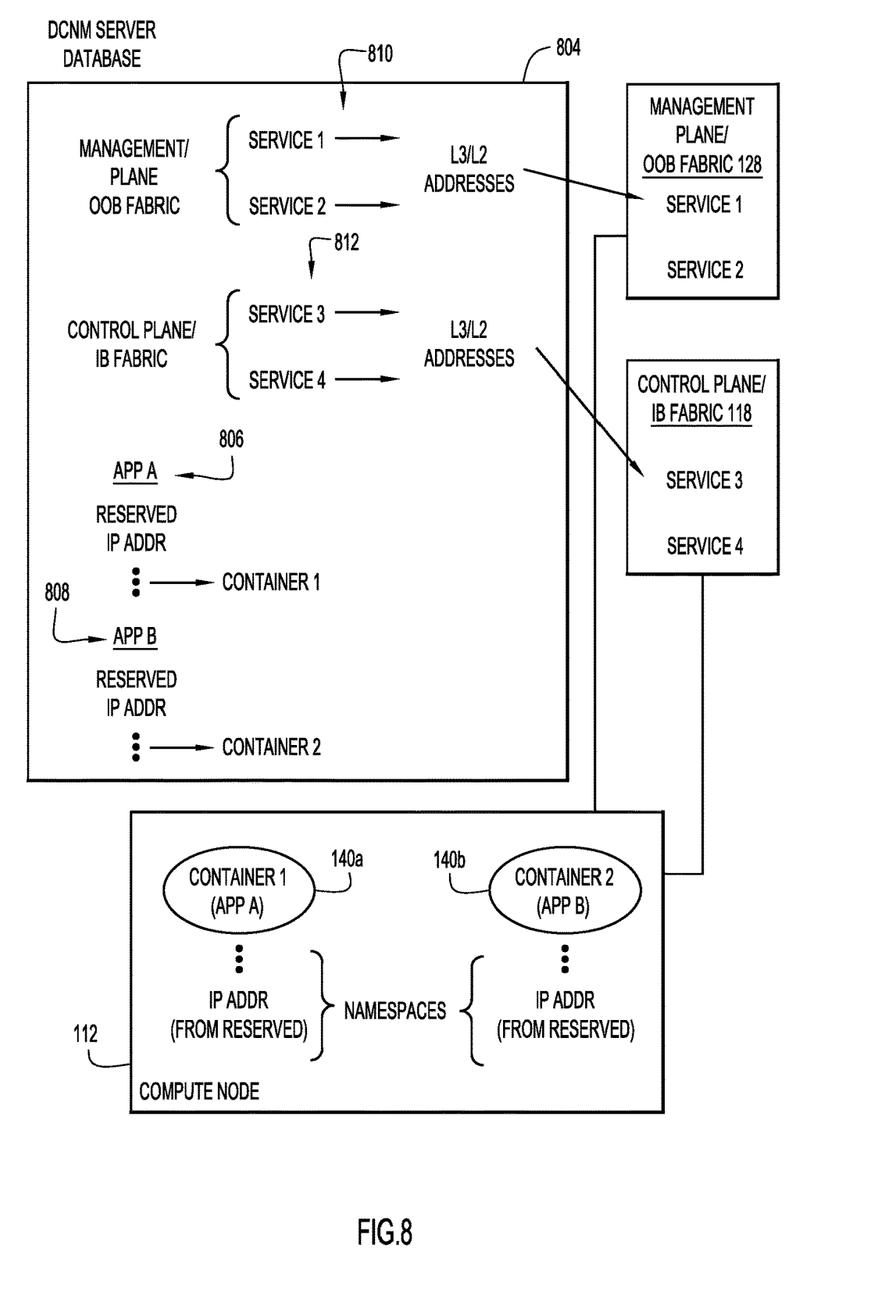
FIG. 8 is an illustration of network connectivity information distributed throughout the DCNM, according to an example embodiment.

FIG. 8 is an illustration of an example of network connectivity information distributed throughout DCNM 102. As mentioned above, server 106 stores and maintains a database 804 that maps reserved, distinct blocks of IP addresses to corresponding applications, as shown at 806 and 808. Database 804 may also indicate to which containers the applications have been deployed and which IP addresses have been assigned to those containers. At 810, DCNM database 804 may also map management plane services (e.g., services 1 and 2) to corresponding specific network connectivity information (e.g., L3 and L2 addresses) in OOB fabric 128. At 812, DCNM database 804 may also map control plane services (e.g., services 3 and 4) to corresponding specific network connectivity information (e.g., L3 and L2 addresses) in IB fabric 118. Server 106 may distribute the network connectivity information for services 1-4 to containers to which applications have been deployed and that use the services, so that the containers can communicate with the services. Also, as shown in FIG. 8, reserved IP addresses from DCNM database 804 have been distributed, and are attached, to application A in container 1 and application B in container 2.

Figure 9:
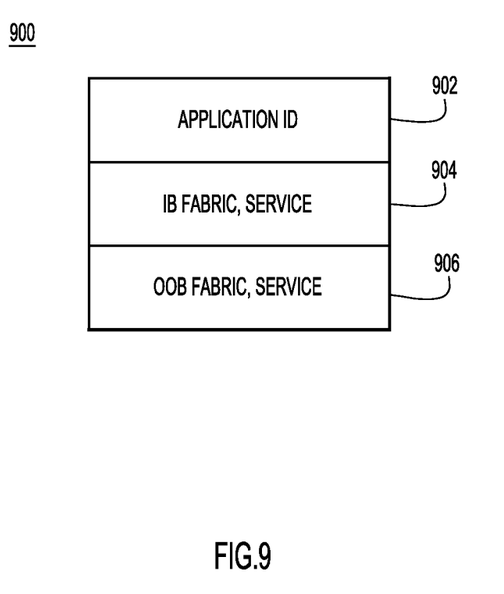
FIG. 9 is an illustration of a message representing a request for network connectivity information, and a response to the request, according to an example embodiment.

FIG. 9 is an illustration of a format of an example message 900 representing a request for network connectivity information sent by a compute node to server 106, and a response to the request sent by the server to the compute node. Message 900 includes a first field 902 to include an application identifier (ID) or name, a second field 904 to request/provide network connectivity information for a control plane service, and a third field 906 to request/provide network connectivity information for a management plane service.

Figure 10:
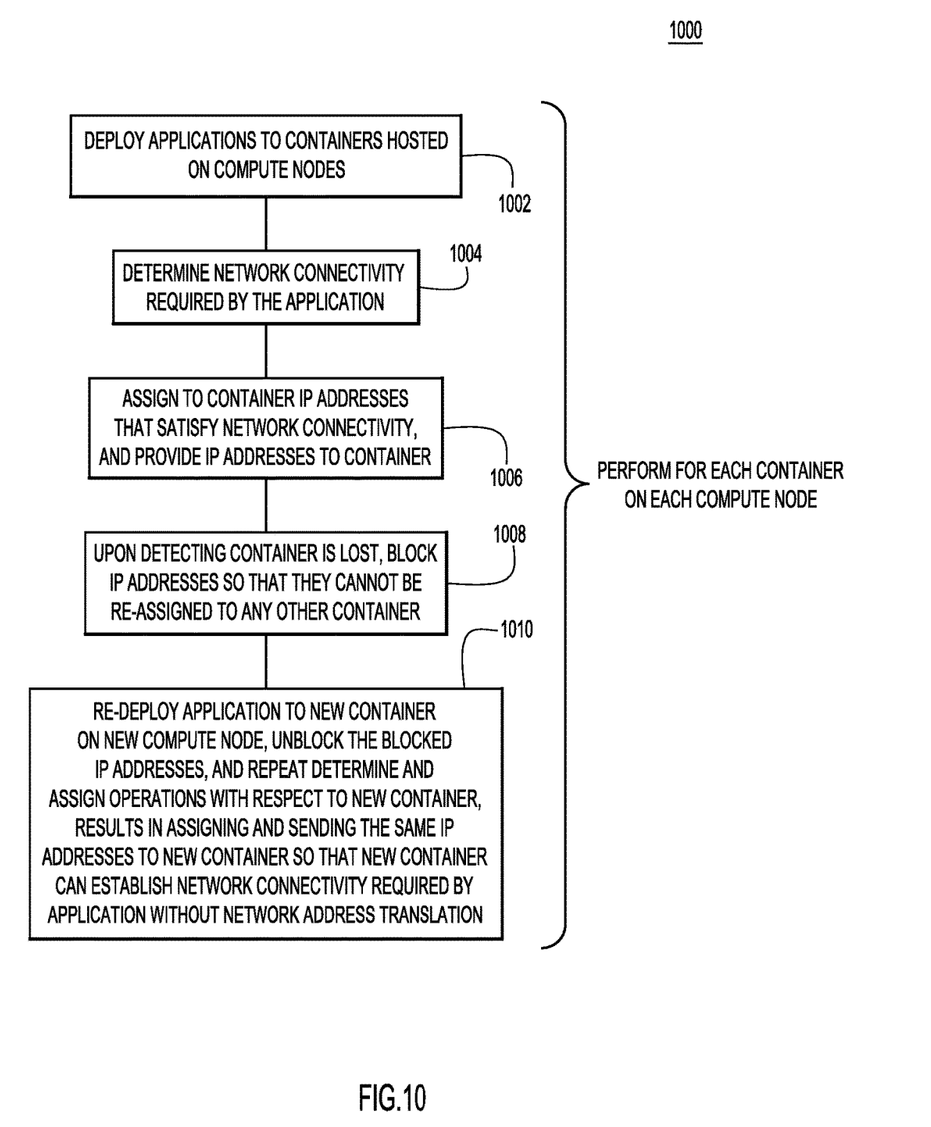
FIG. 10 is a flowchart of a method that combines operations from the method of FIG. 3 with operations from the method of FIG. 4, according to an example embodiment.

With reference to FIG. 10, there is a flowchart of an example method 1000 that includes operations described above in connection with both of methods 300 and 400. Method 100 is performed at a network controller (e.g., server 106) in a distributed network management system (e.g., DCNM 102) configured to manage a network (e.g., switch fabric 104). The network control system includes networked compute nodes (e.g., compute nodes 112 and 114), a first switch fabric (e.g., IB fabric 118) and a second switch fabric (e.g., OOB fabric 128) to connect the compute nodes to a control plane and a management plane of the network, respectively, and network management applications that require network connectivity to the first switch fabric and the second switch fabric to communicate with the management plane and the control plane, respectively, in order to manage the network:

At 1002, the network controller deploys the applications to respective containers (e.g., containers 140*a*, 142*a*, and 144*a*) hosted on the compute nodes (e.g., compute node 112). Operation 1002 includes operations from operation 302.

Next operations 1004-1010 are performed for each container on each compute node, i.e., across the containers hosted on the compute nodes.

At 1004, the controller determines the network connectivity required by the application deployed to the compute node. Operation 1004 includes and/or relies on operations 304 and 308.

At 1006, the controller assigns/allocates to the container one or more IP addresses that satisfy the network connectivity determined at 1004, and provides the one or more IP addresses to the container. Operation 1006 includes operations from operation 310. Operation 1006 causes the compute node on which the container is hosted to create a MAC-VLAN interface on the container namespace and install the one or more IP addresses to the MAC-VLAN interface, thus enabling the application deployed to the container to communicate with the required one or more of the control plane and the management plane via the first and second switch fabrics.

At 1008, the controller detects that the container is lost. Upon detecting that the container is lost, the controller blocks the one or more IP addresses so that the one or more IP addresses cannot be re-assigned to any other container that executes any application other than the application that was deployed to the lost container. Operation 1008 includes operations of operation 404.

At 1010, after operation 1008, the controller detects that the application initially deployed to the lost compute node has migrated to a new container on a new compute node different from the lost compute node, e.g., the controller may re-deploy the application to the new container on the new compute node. Upon re-deploying the application (i.e., migrating the application to the new container), the controller unblocks the blocked one or more IP addresses, and repeats determine operation 1004 and assign operation 1006 with respect to the new container, resulting in assigning and sending the one or more IP addresses to the new container. This causes the new compute node to create a MAC-VLAN interface in the new container namespace and install the one or more IP addresses to the MAC-VLAN interface, thus enabling the application migrated to the new container to establish the network connectivity required by the application without any need for network address translation. Operation 1010, incorporates includes operations from operations 406 and 408.

In summary, DCNM applications take the form of DCNM containers. The DCNM applications are not tenant applications (e.g., applications deployed on public clouds like Microsoft Azure, Amazon cloud, and so on), but are directed towards monitoring, managing and maintaining network fabric 104. Examples of DCNM applications include network telemetry, end point locator, network health calculation, network debugging applications, and the like. The DCNM applications are either gathering information from a network device in network fabric 104 for protocol related information or are passing on information from applications intelligence to configure or debug the network devices, for example. The embodiments presented herein include one or more of the following features:

a. On spawning a DCNM application, one or more DCNM containers can be spawned on any of the compute nodes.

b. Each container has its own namespace.

c. Each application requires IP connectivity towards the control plane (using IB fabric 118) and management plane (using OOB fabric 128) of network fabric 104. To implement this, embodiments presented herein:
   i. To be able to provide an ability to connect the containers to IB fabric 118, create a MAC-VLAN interface inside the namespace of the container, rather than using NAT.
   ii. The disadvantage with using NAT is that it does not provide the ability to move the containers to another compute node because the NAT may lead to a change in an IP address of the container. This causes a loss in connectivity from switch fabric 104 to the container unless the configurations on switch fabric 104 are changed.
d. By creating an interface in the same namespace of the container and maintaining its own IP address management scheme, container mobility can be supported.

The embodiments presented herein provide the DCNM with the ability to scale out its components as needed. The embodiments provide a mechanism to scale while maintaining seamless connectivity to the switch fabric (104) and avoiding the complexity of having to go through NAT to connect with IB fabric 118 (the fabric underlay) for network definition/management. Advantages include: providing straight forward IP connectivity to fabric underlay 118 and the management network 128 for monitoring, managing and maintaining the network; and providing a lean architecture where large size network plugins are not needed to solve underlay connectivity from a container swarm/cluster. The embodiments may be used by data center providers using network controllers for managing/monitoring networks. This includes enterprise/service provider/MSDC/software defined networks (SDNs).

A method is provided comprising: at a controller in a network management system configured to manage a network, the network management system including networked compute nodes, a first switch fabric and a second switch fabric to connect the compute nodes to a control plane and a management plane of the network, respectively, and network management applications that require network connectivity to the first switch fabric and the second switch fabric to communicate with the management plane and the control plane, respectively, in order to manage the network: deploying the applications to respective containers hosted on the compute nodes; for each container on each compute node: determining the network connectivity required by the application; assigning to the container one or more Internet Protocol (IP) addresses that satisfy the network connectivity, and providing the one or more IP addresses to the container; upon detecting the container is lost, blocking the one or more IP addresses so that the one or more IP addresses cannot be re-assigned to any other container; and upon detecting that the application has been re-deployed to a new container on a new compute node, unblocking the blocked one or more IP addresses, and assigning and sending the one or more IP addresses to the new container to enable the new container to establish the network connectivity required by the application without network address translation.

An apparatus is provided comprising: a network interface unit configured to exchange data with one or more networks; and a processor coupled to the network interface unit and configured to control a network management system configured to manage a network, the network management system including networked compute nodes, a first switch fabric and a second switch fabric to connect the compute nodes to a control plane and a management plane of the network, respectively, and network management applications that require network connectivity to the first switch fabric and the second switch fabric to communicate with the management plane and the control plane, respectively, in order to manage the network, the processor further configured to: deploy the applications to respective containers hosted on the compute nodes; for each container on each compute node: determine the network connectivity required by the application; assign to the container one or more Internet Protocol (IP) addresses that satisfy the network connectivity, and providing the one or more IP addresses to the container; upon detecting the container is lost, block the one or more IP addresses so that the one or more IP addresses cannot be re-assigned to any other container; and upon detecting that the application has been re-deployed to a new container on a new compute node, unblock the blocked one or more IP addresses, and assign and send the one or more IP addresses to the new container to enable the new container to establish the network connectivity required by the application without network address translation.

A non-transitory computer readable medium is provided. The computer readable medium is encoded with instructions that, when executed by a processor in a network management system configured to manage a network, the network management system including networked compute nodes, a first switch fabric and a second switch fabric to connect the compute nodes to a control plane and a management plane of the network, respectively, and network management applications that require network connectivity to the first switch fabric and the second switch fabric to communicate with the management plane and the control plane, respectively, in order to manage the network, cause the processor to perform: deploying the applications to respective containers hosted on the compute nodes; for each container on each compute node: determining the network connectivity required by the application; assigning to the container one or more Internet Protocol (IP) addresses that satisfy the network connectivity, and providing the one or more IP addresses to the container; upon detecting the container is lost, blocking the one or more IP addresses so that the one or more IP addresses cannot be re-assigned to any other container; and upon detecting that the application has been re-deployed to a new container on a new compute node, unblocking the blocked one or more IP addresses, and assigning and sending the one or more IP addresses to the new container to enable the new container to establish the network connectivity required by the application without network address translation.

The above description is intended by way of example only. Various modifications and structural changes may be made therein without departing from the scope of the concepts described herein and within the scope and range of equivalents of the claims.

What is claimed is:

1. A method comprising:
   at a controller in a network management system configured to manage a network, the network management system including networked compute nodes, a first switch fabric including first network devices and a second switch fabric including second network devices to connect the compute nodes to a control plane and a management plane of the network, respectively, and network management applications that require network connectivity to the first switch fabric and the second switch fabric to communicate with the management plane and the control plane of the network, respectively, in order to manage the network:

reserving for each application a distinct set of Internet Protocol (IP) addresses for use by the application for connectivity to the first switch fabric and the second switch fabric;

deploying the applications to respective containers hosted on the compute nodes;

for each container on each compute node:

determining the network connectivity required by the application deployed to the container includes network connectivity to the first switch fabric and the second switch fabric;

assigning to the container the distinct set of IP addresses reserved for the application that satisfy the network connectivity, including assigning respective IP addresses to each of the first switch fabric and the second switch fabric, and providing the distinct set of IP addresses to the container;

upon detecting the container is lost, blocking the distinct set of IP addresses so that the distinct set of IP addresses cannot be re-assigned to any other container; and upon detecting that the application has been re-deployed to a new container on a new compute node, unblocking the blocked distinct set of IP addresses, and assigning and sending the distinct set of IP addresses to the new container to enable the new container to establish the network connectivity to the first switch fabric and the second switch fabric required by the application without network address translation.

2. The method of claim 1, wherein:

the determining includes receiving from the compute node a request for network connectivity information that identifies the application deployed to the container and indicates that the container requires network connectivity to the first switch fabric and the second switch fabric; and the assigning includes assigning to the container a respective IP address for each switch fabric indicated in the request.

3. The method of claim 2, wherein the assigning includes assigning to the container the distinct set of IP addresses reserved for use by the application deployed to the container as identified in the request from the compute node.

4. The method of claim 3, further comprising, at the controller:

in a database, mapping each application to the distinct set of IP addresses reserved for the application for connectivity to the first switch fabric and the second switch fabric, and recording which of the IP addresses in each distinct set of IP addresses are assigned to containers as a result of the assigning.

5. The method of claim 2, wherein each application specifies the network connectivity required by the application, and the method further comprises, at each compute node, for each container on the compute node:

examining the application for the network connectivity specified by the application deployed to the container; and sending to the controller the request for network connectivity information based on results of the examining.

6. The method of claim 2, wherein the deploying results in creating in each container a respective container namespace, and the method further comprises, at each compute node, for each container on the compute node:

receiving the distinct set of IP addresses and attaching the received distinct set of IP addresses to the container namespace to establish network connectivity between the container and the first switch fabric and the second switch fabric as required by the application deployed to the container.

7. The method of claim 6, wherein:

the creating includes creating in each container namespace a respective MAC-VLAN interface; and the attaching includes attaching the distinct set of IP addresses to the MAC-VLAN interface of the container namespace.

8. The method of claim 1, wherein:

the network includes network devices each having respective switch ports configured to provide connectivity to the control plane and a data plane of the network, and a respective management port configured to provide connectivity to the management plane of the network; and the first switch fabric and the second switch fabric are configured to communicate with the switch ports and the management ports of the network devices.

9. The method of claim 1, further comprising, at the controller, after the detecting that the application has been re-deployed to the new container, repeating the determining and the assigning with respect to the new container, resulting in the assigning and the sending the distinct set of IP addresses to the new container.

10. The method of claim 1, wherein the detecting that the container is lost includes detecting that the container has died or that connectivity to the compute node is lost.

11. A apparatus comprising:

a network interface unit configured to exchange data with one or more networks; and a processor coupled to the network interface unit and configured to control a network management system configured to manage a network, the network management system including networked compute nodes, a first switch fabric including first network devices and a second switch fabric including second network devices to connect the compute nodes to a control plane and a management plane of the network, respectively, and network management applications that require network connectivity to the first switch fabric and the second switch fabric to communicate with the management plane and the control plane of the network, respectively, in order to manage the network, the processor further configured to:

reserve for each application a distinct set of Internet Protocol (IP) addresses for use by the application for connectivity to the first switch fabric and the second switch fabric;

deploy the applications to respective containers hosted on the compute nodes;

for each container on each compute node:

determine the network connectivity required by the application deployed to the container includes network connectivity to the first switch fabric and the second switch fabric;

assign to the container the distinct set of IP addresses reserved for the application that satisfy the network connectivity, including assigning respective IP addresses to each of the first switch fabric and the second switch fabric, and providing the distinct set of IP addresses to the container;

upon detecting the container is lost, block the distinct set of IP addresses so that the distinct set of IP addresses cannot be re-assigned to any other container; and upon detecting that the application has been re-deployed to a new container on a new compute node, unblock the blocked distinct set of IP addresses, and assign and send the distinct set of IP addresses to the new container to enable the new container to establish the network connectivity to the first switch fabric and the second switch fabric required by the application without network address translation.

12. The apparatus of claim 11, wherein the processor is configured to:

determine by receiving from the compute node a request for network connectivity information that identifies the application deployed to the container and indicates that the container requires network connectivity to the first switch fabric and the second switch fabric; and assign by assigning to the container a respective IP address for each switch fabric indicated in the request.

13. The apparatus of claim 12, wherein the processor is further configured to assign by assigning to the container the distinct set of IP addresses reserved for use by the application deployed to the container as identified in the request from the compute node.

14. The apparatus of claim 13, wherein the processor is further configured to:

in a database, map each application to the distinct set of IP addresses reserved for the application for connectivity to the first switch fabric and the second switch fabric, and record which of the IP addresses in each distinct set of IP addresses are assigned to containers as a result of the assigning.

15. The apparatus of claim 12, wherein each container includes a respective container namespace, and the one or more IP addresses are attached to the container namespace to establish network connectivity between the container and the first switch fabric and the second switch fabric as required by the application deployed to the container.

16. The apparatus of claim 15, wherein the distinct set of IP addresses are attached to a MAC-VLAN interface in the container namespace.

17. A non-transitory computer readable medium encoded with instructions that, when executed by a processor in a network management system configured to manage a network, the network management system including networked compute nodes, a first switch fabric and a second switch fabric to connect the compute nodes to a control plane and a management plane of the network, respectively, and network management applications that require network connectivity to the first switch fabric and the second switch fabric to communicate with the management plane and the control plane, respectively, in order to manage the network, cause the processor to perform:

reserving for each application a distinct set of Internet Protocol (IP) addresses for use by the application for connectivity to the first switch fabric and the second switch fabric;

deploying the applications to respective containers hosted on the compute nodes;

for each container on each compute node:

determining the network connectivity required by the application deployed to the container includes network connectivity to the first switch fabric and the second switch fabric;

assigning to the container the distinct set of IP addresses reserved for the application that satisfy the network connectivity, including assigning respective IP addresses to each of the first switch fabric and the second switch fabric, and providing the distinct set of IP addresses to the container;

upon detecting the container is lost, blocking the distinct set of IP addresses so that the distinct set of IP addresses cannot be re-assigned to any other container; and upon detecting that the application has been re-deployed to a new container on a new compute node, unblocking the blocked distinct set of IP addresses, and assigning and sending the distinct set of IP addresses to the new container to enable the new container to establish the network connectivity to the first switch fabric and the second switch fabric required by the application without network address translation.

18. The non-transitory computer readable medium of claim 17, wherein:

the instructions to cause the processor to perform the determining include instructions to cause the processor to perform receiving from the compute node a request for network connectivity information that identifies the application deployed to the container and indicates that the container requires network connectivity to the first switch fabric and the second switch fabric; and the instructions to cause the processor to perform the assigning include instructions to cause the processor to perform assigning to the container a respective IP address for each switch fabric indicated in the request.

19. The non-transitory computer readable medium of claim 18, wherein the instructions to cause the processor to perform the assigning include further instructions to cause the processor to perform assigning to the container the distinct set of IP addresses reserved for use by the application deployed to the container as identified in the request from the compute node.

20. The non-transitory computer readable medium of claim 18, wherein the deploying results in creating in each container a respective container namespace, and the non-transitory computer readable medium further comprises, at each compute node, for each container on the compute node:

receiving the distinct set of IP addresses and attaching the received distinct set of addresses to the container namespace to establish network connectivity between the container and the first switch fabric and the second switch fabric as required by the application deployed to the container.

* * * * *